US 9,657,995 B2

(12) United States Patent
Nagai et al.

(10) Patent No.: US 9,657,995 B2
(45) Date of Patent: May 23, 2017

(54) DEVICE FOR MONITORING INSIDE OF HIGH-TEMPERATURE FURNACE, AND SYSTEM FOR MONITORING INSIDE OF HIGH-TEMPERATURE FURNACE PROVIDED WITH SAME (71) Applicant: MITSUBISHI HEAVY INDUSTRIES ENVIRONMENTAL & CHEMICAL ENGINEERING CO., LTD., Yokohama-shi, Kanagawa (JP)

(72) Inventors: Hiroshi Nagai, Tokyo (JP); Tomohiro Harada, Tokyo (JP); Akira Noma, Tokyo (JP); Toshimasa Shirai, Yokohama (JP)

(73) Assignee: MITSUBISHI HEAVY INDUSTRIES ENVIRONMENTAL & CHEMICAL ENGINEERING CO., LTD., Kanagawa (JP)

( * ) Notice: Subject to any disclaimer, the term of this patent is extended or adjusted under 35 U.S.C. 154(b) by 200 days.

(21) Appl. No.: 14/437,778

(22) PCT Filed: Oct. 17, 2013

(86) PCT No.: PCT/JP2013/078171
§ 371 (c)(1),
(2) Date: Apr. 22, 2015

(87) PCT Pub. No.: WO2014/065187
PCT Pub. Date: May 1, 2014

(65) Prior Publication Data
US 2015/0285559 A1 Oct. 8, 2015

(30) Foreign Application Priority Data
Oct. 24, 2012 (JP) ................................ 2012-234943

(51) Int. Cl.
H04N 5/225 (2006.01)
F27D 21/02 (2006.01)
(Continued)

(52) U.S. Cl.
CPC ................ *F27D 21/02* (2013.01); *C10J 3/00* (2013.01); *C10J 3/46* (2013.01); *F23M 11/04* (2013.01);
(Continued)

(58) Field of Classification Search
CPC ... F27D 21/02; F27D 2021/026; H04N 5/225; H04N 2005/2255
See application file for complete search history.

(56) References Cited

U.S. PATENT DOCUMENTS 6,229,563 B1 * 5/2001 Miller, II ................ F27D 21/02
348/82
2013/0192501 A1 * 8/2013 Lu ............................ C10J 3/485
110/336

FOREIGN PATENT DOCUMENTS

JP 3-105195 A 5/1991
JP 527598 U 4/1993
(Continued)

OTHER PUBLICATIONS

Extended European Search Report in EP Application No. 13849074.3 dated Jun. 3, 2016.
(Continued)

*Primary Examiner* — Huy T Nguyen
(74) *Attorney, Agent, or Firm* — Kanesaka Berner & Partners LLP (57) ABSTRACT Provided is an outer casing having a bottomed tube shape, the casing having a cooling water supply port, and a cooling water discharge port, and being inserted into a high-temperature furnace; an inner casing having a bottomed tube shape inserted into the outer casing; an imaging unit that is disposed in the inner casing which captures an image of the exterior of the outer casing; and partition members that are between an inner surface of the outer casing and an outer surface of the inner casing which define a first flow channel,
(Continued)

a second flow channel, and a communicating channel for communicating the first flow channel and the second flow channel between the bottom of the outer casing and the partition members.

5 Claims, 10 Drawing Sheets (51) Int. Cl.
*F23M 11/04* (2006.01)
*C10J 3/00* (2006.01)
*G01J 5/08* (2006.01)
*G01J 5/00* (2006.01)
*G01J 5/02* (2006.01)
*G01J 5/04* (2006.01)
*G01J 5/06* (2006.01)
*F27D 21/00* (2006.01)
*C10J 3/46* (2006.01)
*C21C 5/52* (2006.01)

(52) U.S. Cl.
CPC ......... *F27D 21/00* (2013.01); *F27D 21/0014* (2013.01); *G01J 5/0044* (2013.01); *G01J 5/029* (2013.01); *G01J 5/04* (2013.01); *G01J 5/061* (2013.01); *G01J 5/0893* (2013.01); *H04N 5/225* (2013.01); *C21C 2005/5288* (2013.01); *F27D 2021/026* (2013.01); *G01J 2005/0077* (2013.01); *H04N 2005/2255* (2013.01); *Y02P 10/216* (2015.11)

(56) References Cited

FOREIGN PATENT DOCUMENTS

| JP | 7-146083 A | 6/1995 |
| JP | 2891672 B2 | 5/1999 |
| JP | 2001-304526 A | 10/2001 |
| JP | 2002-90070 A | 3/2002 |
| JP | 2002-98318 A | 4/2002 |
| JP | 2003-277815 A | 10/2003 |
| JP | 3781800 B2 | 5/2006 |
| JP | 4015354 B2 | 11/2007 |

OTHER PUBLICATIONS

International Search Report mailed Jan. 21, 2014 in International Application No. PCT/JP2013/078171 filed Oct. 17, 2013.
Written Opinion mailed Jan. 21, 2014, corresponding to International patent application No. PCT/JP2013/078171.

* cited by examiner

DEVICE FOR MONITORING INSIDE OF HIGH-TEMPERATURE FURNACE, AND SYSTEM FOR MONITORING INSIDE OF HIGH-TEMPERATURE FURNACE PROVIDED WITH SAME

RELATED APPLICATIONS

The present application is a National Phase of International Application Number PCT/JP2013/078171, filed Oct. 17, 2013, which claims priority to Japanese Application Number 2012-234943, filed Oct. 24, 2012.

TECHNICAL FIELD

The present invention relates to a device for monitoring the inside of a high-temperature furnace, and a system for monitoring the inside of the high-temperature furnace provided with the same.

Priority is claimed on Japanese Patent Application No. 2012-234943, filed on Oct. 24, 2012, the content of which is incorporated herein by reference.

BACKGROUND ART

Figure 11:
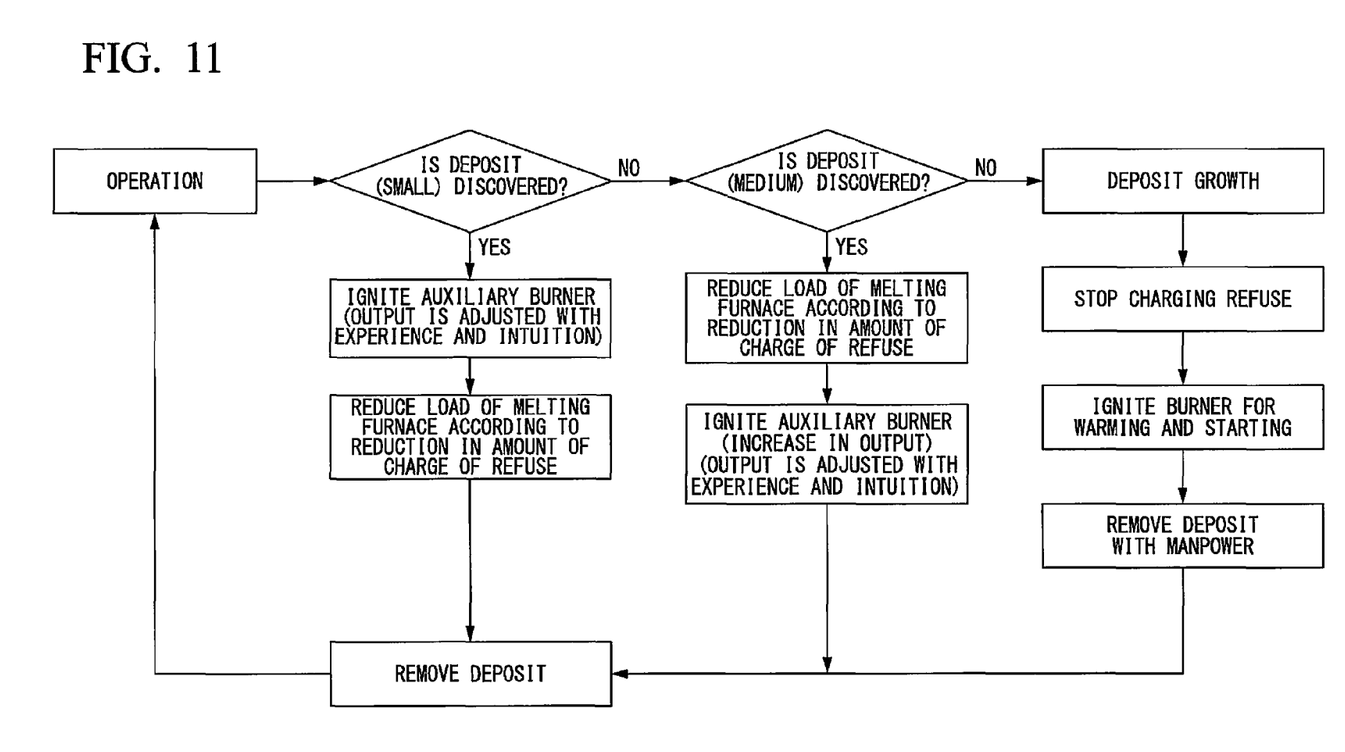
FIG. 11 is a flow chart illustrating work of monitoring the inside of a related art high-temperature furnace.

As floating slag and soot are generated in a high-temperature furnace such as a gasification melting furnace, an ash melting furnace, or a refuse incinerator, clinker or slag (deposit) may be deposited and grow. For example, as illustrated in FIG. 11, due to the deposition and growth of the clinker or slag, a gas stream is obstructed and poor melting of fly ash occurs, or work of releasing the deposit by raising output of an auxiliary burner is required in the early stage of the deposition, or when the deposition and growth thereof are advanced to some extent, an operation is stopped and work of releasing the deposit using, for instance, a rammer is required. Further, since it is important to detect and deal with the deposit early on in order to increase work efficiency, in the related art, an observation window through which a deposition state of the deposit can be checked has been provided on a furnace. However, the entire inside of the furnace looks red due to high-temperature incinerated molten materials, and it is difficult to observe the deposit accurately through the observation window.

On the other hand, a procedure of directly inserting a water-cooled and air-cooled monitoring camera (device for monitoring the inside of a high-temperature furnace) into a furnace, capturing an image of the inside of the furnace, and thereby enable early detection of a deposit has been proposed and put to practical use (for example, see Patent Literatures 1 and 2).

CITATION LIST

Patent Literature

[Patent Literature 1]
Japanese Patent No. 2891672
[Patent Literature 2]
Japanese Unexamined Patent Application, First Publication No. 2002-090070

SUMMARY OF INVENTION

Technical Problem

However, the related art monitoring camera (device for monitoring the inside of a high-temperature furnace) is constructed in a triple or quadruple pipe structure, and a cooling structure is enlarged. Thus, the cooling structure enlarged in this way is provided, and thereby the monitoring camera is increased in weight, and it is difficult to handle the monitoring camera. It is necessary to permanently install and operate the monitoring camera, or to operate the monitoring camera with a limitation on the number of times of monitoring the inside of the furnace.

Further, when the monitoring camera is permanently installed, slag or clinker is deposited on a cooling pipe. Thus, as the deposit grows, there is a disadvantage such that monitoring becomes impossible due to damage of the cooling pipe or the camera, or uninstalling of the monitoring camera becomes difficult.

Furthermore, when the monitoring camera is inserted from the observation window, the observation window is blocked by the slag or the clinker, and thus it is necessary to insert the monitoring camera after the slag or the clinker is removed. At this time, as the monitoring camera is large in size and diameter, a great effort is required for work of removing the slag or the clinker. For this reason, there is a strong need to make the monitoring camera as small as possible.

Further, in the related art monitoring camera, the cooling structures (multiple pipes) are integrally formed by welding. Thus, even when the slag or the clinker is deposited on the camera or when the camera malfunctions, it is impossible to disassemble the device. Thus, maintenance, exchange, and fine adjustment of, for example, a position and a direction of the camera are also impossible.

Furthermore, in the related art monitoring camera, when the water-cooled and air-cooled monitoring camera is directly inserted into the furnace and captures the image of the inside of the furnace, it is possible to detect presence or absence of the deposit in the furnace. However, when there is a great amount of floating slag and soot, and when there is no contrast in the deposit due to a high-temperature state and the captured image looks two-dimensional, it is impossible to determine a distance to the deposit and a size of the deposit.

Thus, as illustrated in FIG. 11, since the size of the deposit cannot be determined, output adjustment of the auxiliary burner cannot be controlled based on the size of the deposit. Therefore, under the present conditions, the output of the auxiliary burner is decided by experience and intuition of a worker, and the releasing work of the deposit is performed. Furthermore, in the gasification furnace (refuse incinerator), when the auxiliary burner is ignited, it is necessary to reduce a refuse disposal amount to lighten a load of the melting furnace. However, as the size of the deposit cannot be determined, the refuse disposal amount cannot be properly controlled during the releasing work of the deposit.

Solution to Problem

According to a first aspect of the present invention, a device for monitoring an inside of a high-temperature furnace includes: an outer casing formed in a bottomed tube shape, configured to have a cooling water supply port through which cooling water is introduced, and a cooling water discharge port through which cooling water is discharged formed at a side of a rear end thereof in a direction of an axis, and inserted into the high-temperature furnace; an inner casing which is formed in a bottomed tube shape and is inserted into and disposed in the outer casing and into which cooling air is supplied; an imaging device disposed in the inner casing and configured to capture an image of an exterior of the outer casing; and partition members arranged between an inner surface of the outer casing and an outer surface of the inner casing, and configured to define a first flow channel that leads the cooling water toward front ends of the casings in the direction of the axis and a second flow channel that leads the cooling water toward rear ends of the casings between the inner surface of the outer casing and the partition members, and a communicating channel that communicates the first flow channel and the second flow channel between a bottom of the outer casing and the partition members.

Further, according to a second aspect of the present invention, in the device for monitoring the inside of the high-temperature furnace according to the first aspect, the inner casing may be formed with an inner casing imaging port that passes through an inner surface and the outer surface thereof and be integrally provided with a cylindrical plug connector part that protrudes outward in a direction perpendicular to the axis while communicating an interior thereof with the inner casing imaging port; the outer casing may be formed with an outer casing imaging port that passes through the inner surface and an outer surface thereof; a waterproof plug having a substantially cylindrical shape may be connected to the plug connector part from an outside of the outer casing through the outer casing imaging port in a state in which interiors of the waterproof plug and the plug connector part communicate with each other, and the outer casing and the inner casing may be detachably formed in one body via the waterproof plug and the plug connector parts; and the inner casing imaging port, the interior of the plug connector part, the outer casing imaging port, and the interior of the waterproof plug may communicate with each other while waterproofness of the first flow channel and the second flow channel is secured by the waterproof plug, and an imaging hole for capturing an image of the exterior of the outer casing using the imaging device may be formed.

Furthermore, according to a third aspect of the present invention, in the device for monitoring the inside of the high-temperature furnace according to the first or second aspect, a gate that passes through the inner surface and the outer surface thereof and inserts and removes the imaging device into and from the interior thereof may be formed in the inner casing, and a cover member that closes the gate may be detachably provided in the inner casing.

Further, according to a fourth aspect of the present invention, in the device for monitoring the inside of the high-temperature furnace according to any one of the first to third aspects, a plurality of imaging devices may be provided in the inner casing; and the plurality of imaging devices may be arranged such that partial image capturing regions of the neighboring imaging devices overlap.

Further, according to a fifth aspect of the present invention, a system for monitoring the inside of a high-temperature furnace according to any one of the first to fourth aspects includes: the device for monitoring the inside of the high-temperature furnace according to any one of the above aspects, wherein the device is inserted into and disposed in the high-temperature furnace and monitors a generated state of a deposit in the furnace; an auxiliary burner provided in the furnace and configured to release the deposit; a burning/melting target feeder configured to feed a burning/melting target into the furnace; and a controller configured to discriminate a size of the deposit from an image acquired by the imaging device of the device for monitoring the inside of the high-temperature furnace and to control driving of the auxiliary burner and the burning/melting target feeder based on the size of the deposit.

Advantageous Effects of Invention

In the aforementioned device for monitoring the inside of the high-temperature furnace, as the partition members (barriers) are provided in the double pipe structure of the outer casing and the inner casing, one half of the space between the outer casing and the inner casing can be made into a first flow channel serving as a feed flow channel (main channel) of cooling water, and the other half can be made into a second flow channel serving as a return flow channel (return channel) of the cooling water. Thereby, in comparison with a related art device constructed in a triple or quadruple pipe structure, the device can be remarkably reduced in size and weight.

Thus, according to the aforementioned device for monitoring the inside of the high-temperature furnace, in comparison with the related art, the device has good handleability. When the inside of the furnace is monitored as needed, no great burden occurs even if the device is inserted into and installed in the furnace each time. Without a limitation on the number of times of monitoring the inside of the furnace, the monitoring work can be suitably carried out. Further, even when the observation window used when the device is inserted into the furnace is blocked by the slag or the clinker, the device is miniaturized, and thus work of removing the slag or the clinker can be remarkably reduced compared to the related art.

Further, in the aforementioned device for monitoring the inside of the high-temperature furnace, the outer casing and the inner casing are detachably connected via the waterproof plugs, and thereby the double pipe structure can be constructed. For this reason, as the waterproof plugs are removed, the inner casing can be removed from the outer casing. Thereby, exchange or maintenance of the imaging device such as a CCD camera or a fiberscope, adjustment of the imaging device in a field-of-view direction, etc. can be easily performed. Accordingly, it is possible to improve the handleability of the device for monitoring the inside of the high-temperature furnace, and to monitor the inside of the high-temperature furnace in a more accurate and efficient way.

Furthermore, in the aforementioned device for monitoring the inside of the high-temperature furnace, since the gate is formed in the inner casing and is closed by the detachable cover member, the cover member is removed as needed, and the exchange or maintenance of the imaging device, the adjustment of the imaging device in the field-of-view direction, etc. can be more easily performed through the gate.

Further, in the aforementioned device for monitoring the inside of the high-temperature furnace, the plurality of imaging devices are provided in the inner casing, and the partial image capturing regions of the neighboring imaging device are arranged to overlap, that is, the imaging devices are arranged in order to obtain a stereoscopic image. Thereby, it is possible to acquire a 3D image of the deposit whose image is captured at the portion at which the image capturing regions overlap. Thereby, a distance between the deposit and the imaging devices can be accurately measured in the high-temperature furnace. As a result, the size of the deposit can be discriminated precisely. Accordingly, it is possible to drive the auxiliary burner with a suitable timing corresponding to the size of the deposit and to release the deposit. It is possible to eliminate decision of the output of the auxiliary burner depending on experience and intuition of a worker as in the related art, or stopping of the operation of the furnace to release the deposit with manpower when the deposit grows too large.

In the aforementioned system for monitoring the inside of the high-temperature furnace, operation and effects of the device for monitoring the inside of the high-temperature furnace can be obtained, and the controller discriminates the size of the deposit from the image acquired by the imaging devices of the device for monitoring the inside of the high-temperature furnace, and controls driving of the auxiliary burner and the burning/melting target feeder based on the size of the deposit. Thereby, it is possible to discriminate the growth of the deposit to automatically perform optimal operation control of the auxiliary burner. It is possible to reduce a fuel cost, and to prevent damage to the furnace. Further, the driving of the burning/melting target feeder is controlled such that an amount of charge (feed) of the burning/melting target is reduced depending on an amount of output of the auxiliary burner. Thereby, when the auxiliary burner is ignited, an amount of treatment of the burning/melting target can be automatically reduced to lighten the load of the furnace.

DESCRIPTION OF EMBODIMENTS

Hereinafter, a device for monitoring the inside of a high-temperature furnace and a system for monitoring the inside of a high-temperature furnace provided with the same according to an embodiment of the present invention will be described with reference to FIGS. 1 to 10. Further, it is described in the present embodiment that the device for monitoring the inside of the high-temperature furnace and the system for monitoring the inside of the high-temperature furnace are provided for a facility that performs gasification melting treatment on an incinerating target (burning/melting target) such as urban refuse. Of course, the device for monitoring the inside of the high-temperature furnace and the system for monitoring the inside of the high-temperature furnace according to the present embodiment may be applied to other furnaces such as an ash melting furnace in which much floating slag and soot are generated, and may be adequately used, for instance, for a furnace with an internal temperature ranging from about 700 to 1600° C.

Figure 1:
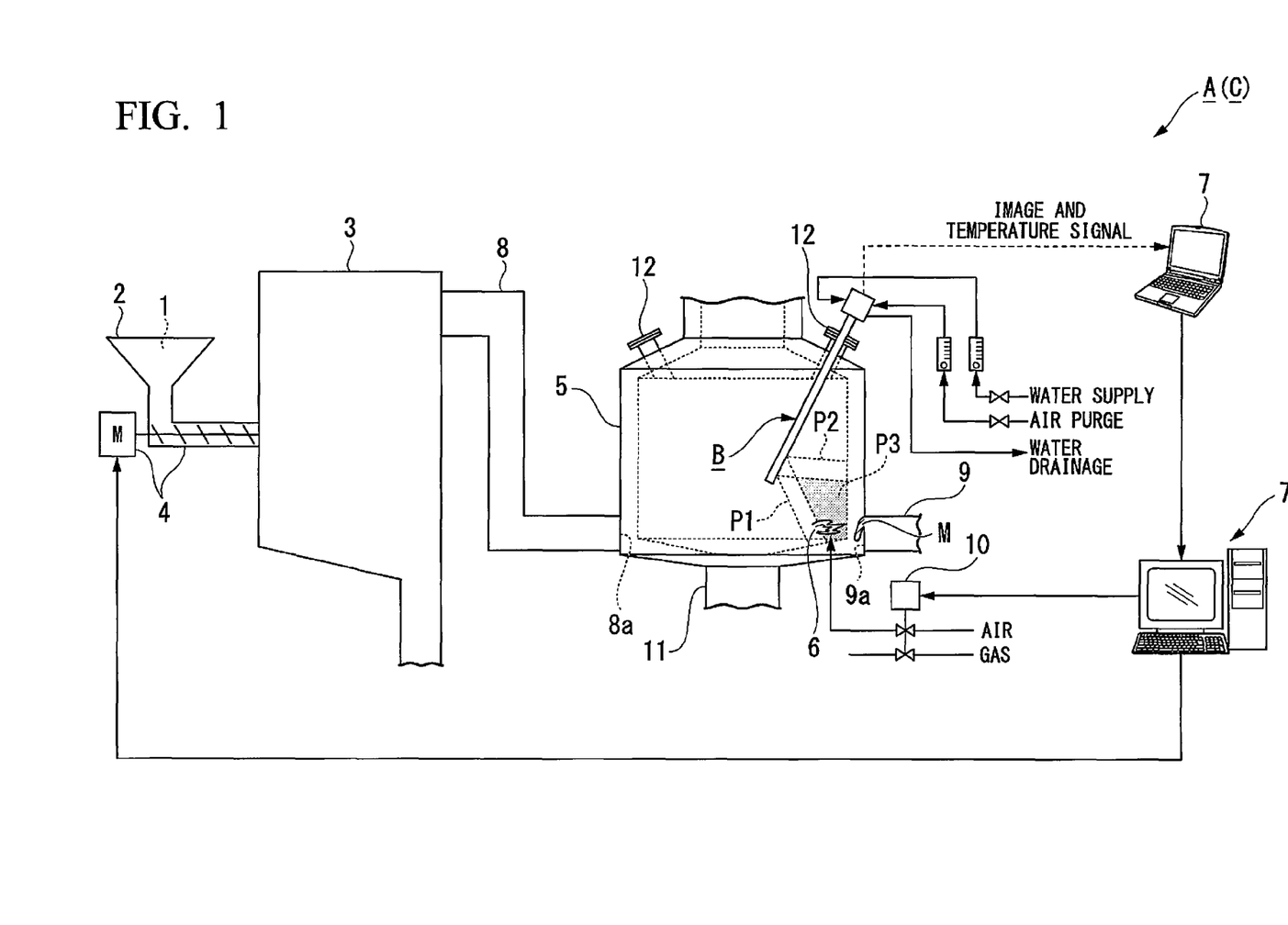
FIG. 1 is a view illustrating a system for monitoring the inside of a high-temperature furnace and a device for monitoring the inside of the high-temperature furnace according to an embodiment of the present invention.

As illustrated in FIG. 1, an incineration facility A of the present embodiment is constructed to have a hopper (hopper chute) 2 that temporarily stores an incinerating target (burning/melting target) 1, a gasification furnace 3 that heats and gasifies the incinerating target 1 under low oxygen conditions, an incinerating target feeder (burning/melting target feeder) 4 that charges the incinerating target 1 from the hopper 2 into the gasification furnace 3, a melting furnace (furnace) 5 into which a combustible gas and charcoal produced at the gasification furnace 3 are charged and which melts ash (charcoal) while being burnt at a temperature of, for instance, 1300° C. or more, a device B for monitoring the inside of a high-temperature furnace and monitoring the inside of the melting furnace 5, and a controller 7 that controls driving of an auxiliary burner 6 arranged inside the melting furnace 5 and driving of the incinerating target feeder 4 based on monitoring results of the device B for monitoring the inside of the high-temperature furnace. Further, in the present embodiment, the device B for monitoring the inside of the high-temperature furnace, the controller 7, the auxiliary burners 6, and the incinerating target feeder 4 constitute a system C for monitoring the inside of a high-temperature furnace.

The melting furnace 5 is a swivel melting furnace, and is connected to the gasification furnace 3 via a first pyrolysis duct 8. The combustible gas and the charcoal are charged from the gasification furnace 3 through the first pyrolysis duct 8. Further, a second pyrolysis duct 9 for discharging exhaust gas after the melting treatment from the melting furnace 5 to the outside is connected to the melting furnace 5. Thus, to project flames toward connecting ports 8a and 9a of the first and second pyrolysis ducts 8 and 9, the auxiliary burners 6 are arranged at the sides of the connecting ports 8a and 9a of the ducts 8 and 9 in the melting furnace 5. Further, an air supplying device and a fuel supplying device for supplying air and fuel gas respectively are connected to each auxiliary burner 6. An output adjusting device 10 that adjusts and operates valves for adjusting an amount of the air to be supplied and an amount of the fuel to be supplied is provided for the air supplying device and the fuel supplying device. The output adjusting device 10 is controlled by the controller 7.

Furthermore, a slag discharge port 11 for discharging molten slag produced by melting of the charged charcoal is provided in a lower portion of the melting furnace 5. Further, for instance, a plurality of observation windows 12, each of which has a diameter of about 150 mm, are provided at an upper portion of the melting furnace 5 in order to observe the inside of the furnace by sight and in order to insert into and dispose the device B for monitoring the inside of the high-temperature furnace in the furnace.

Figure 2:
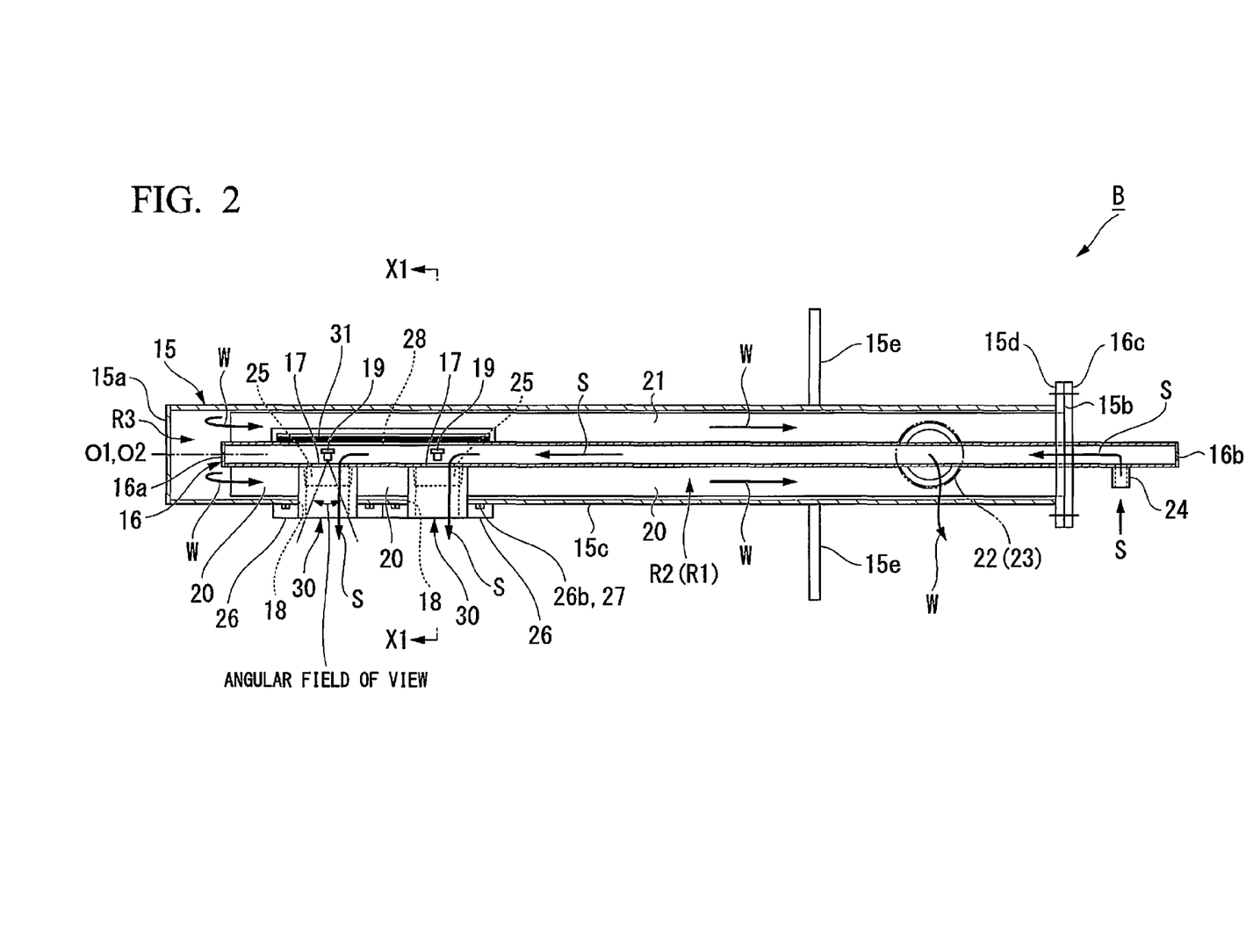
FIG. 2 is a view illustrating the device for monitoring the inside of the high-temperature furnace according to the embodiment of the present invention.
Figure 3:
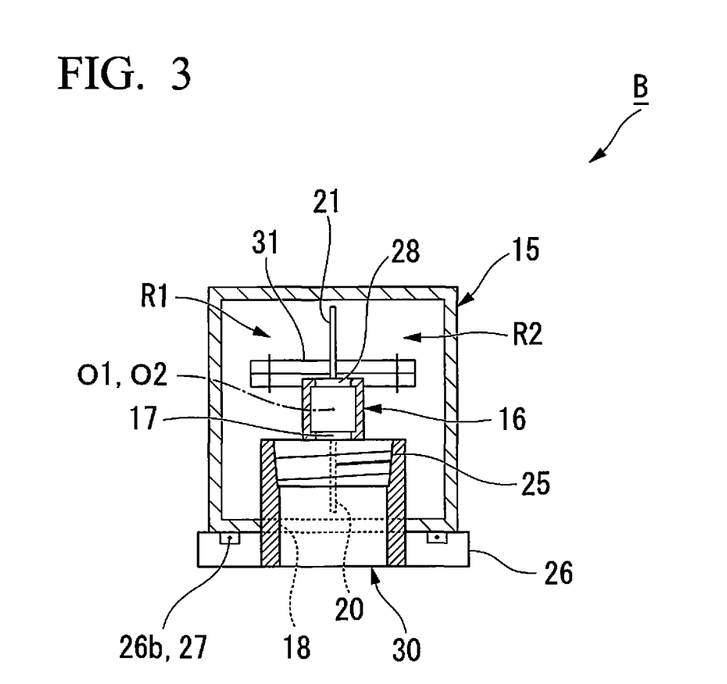
FIG. 3 is a view taken in the direction of an arrow of line X1-X1 of FIG. 2.

On the other hand, the device B for monitoring the inside of the high-temperature furnace, as illustrated in FIGS. 2 and 3 (FIGS. 1, 4, and 5), is constructed to have an outer casing 15 that is formed in a bottomed cylindrical shape with a quadrilateral cross section, an inner casing 16 that is inserted into and disposed in the outer casing 15 with mutual axes O1 and O2 disposed on the same axis and is formed in a bottomed tube shape having a quadrilateral cross section, and imaging devices 19 such as a charge coupled device (CCD) camera or a fiberscope that are inserted into and disposed in a front end 16a of the inner casing 16 in a direction of an axis O2 and capture an image of the outside of the outer casing 15 through inner and outer casing imaging ports 17 and 18 formed through lateral surfaces of inner and outer casings 16 and 15.

Furthermore, the device B for monitoring the inside of the high-temperature furnace is constructed to have partition members 20 and 21 that are arranged between an inner surface of the outer casing 15 and an outer surface of the inner casing 16, define a first flow channel R1 that is a cooling water feed flow channel and leads the cooling water toward front ends 15a and 16a in the directions of the axes O1 and O2 and a second flow channel R2 that is a cooling water return flow channel and leads the cooling water toward rear ends 15b and 16b between the inner surface of the outer casing 15 and the partition members 20 and 21, and define a communicating channel R3 for communicating the first flow channel R1 and the second flow channel R2 between the bottom of the outer casing 15 and the partition members 20 and 21.

Figure 4:
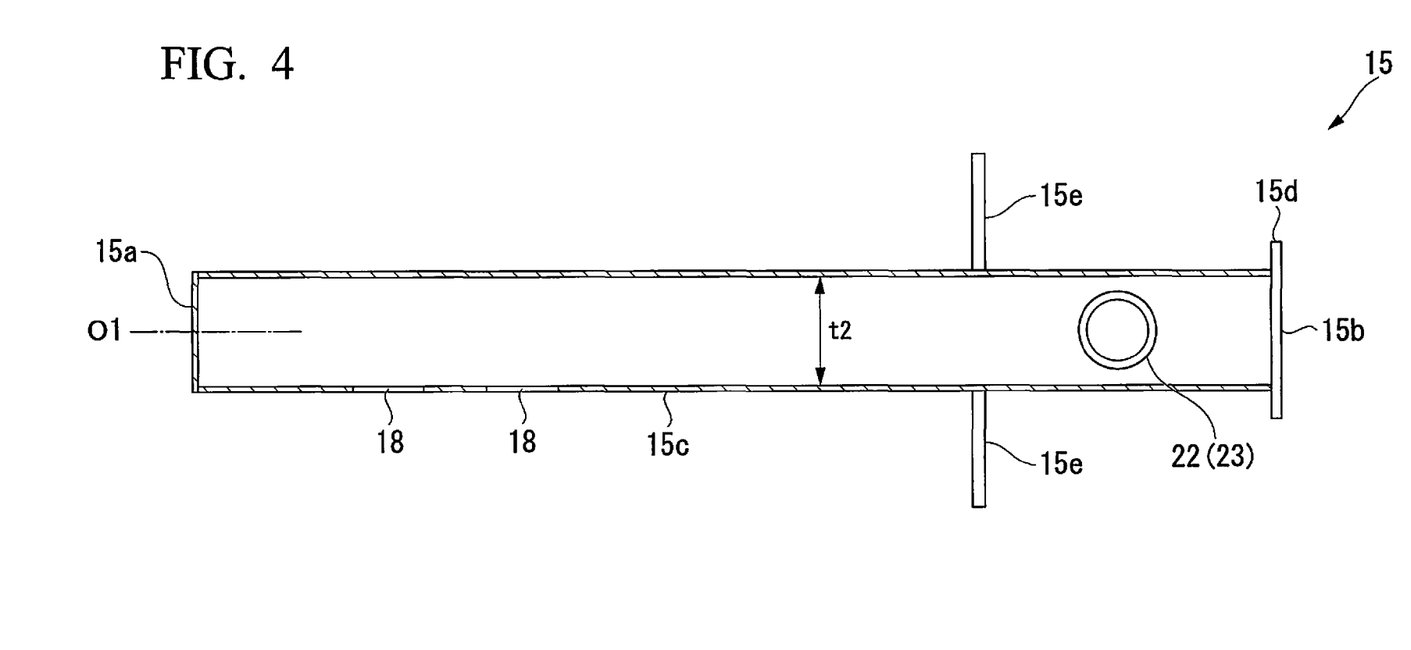
FIG. 4 is a view illustrating an outer casing of the device for monitoring the inside of the high-temperature furnace according to the embodiment of the present invention.

As illustrated in FIG. 4 (FIGS. 2 and 3), the outer casing 15 is formed in a substantially square tube shape having a bottom and one side of about 60 mm and is formed at a length of about 2500 mm in the direction of the axis O1. Further, one lateral surface 15c of the outer casing 15 which is near the front end 15a of the outer casing 15 is formed with two outer casing imaging ports 18 that pass through the inner and outer surfaces and are spaced apart from each other at a predetermined interval, for instance, at an interval of 100 to 300 mm, in the direction of the axis O1. Furthermore, the outer casing 15 is provided with an inner casing mounting flange part 15d at the rear end 15b thereof which protrudes outward in a direction perpendicular to the axis O1 and extends throughout the circumference thereof. Further, the outer casing 15 is provided with main body mounting flange parts 15e that protrude outward from the outer surface thereof in the direction perpendicular to the axis O1 at a predetermined position near the rear end 15b thereof in the direction of the axis O1, for instance, at a position about 2000 mm from the front end 15a in the direction of the axis O1.

Furthermore, the outer casing 15 is formed with through-holes that pass through the inner and outer surfaces at a predetermined position near the rear end 15b thereof in the direction of the axis O1 relative to the main body mounting flange parts 15e of front and rear lateral surfaces perpendicular to the one lateral surface 15c in which the outer casing imaging ports 18 are formed. The through-hole of the front lateral surface becomes a cooling water discharge port 22, and the through-hole of the rear lateral surface becomes a cooling water supply port 23.

Figure 5:
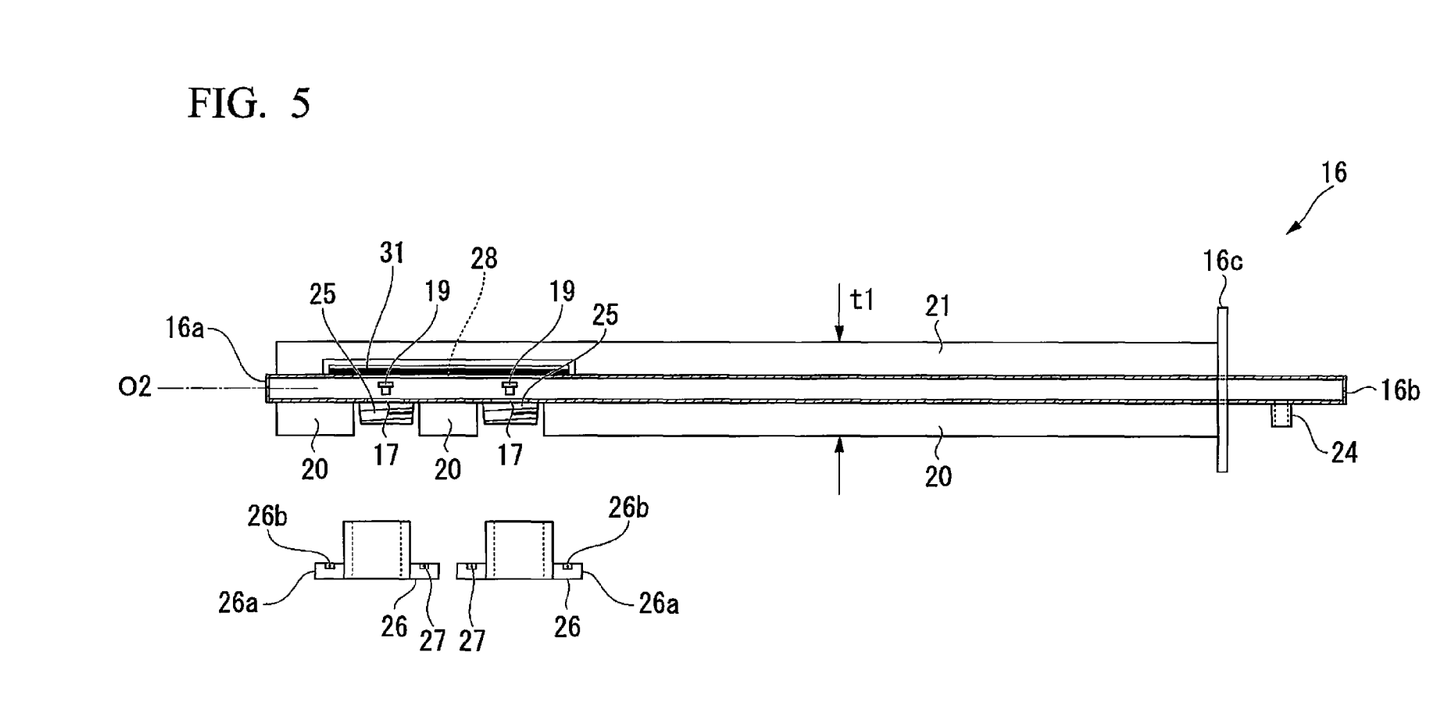
FIG. 5 is a view illustrating an inner casing of the device for monitoring the inside of the high-temperature furnace according to the embodiment of the present invention.
Figure 6:
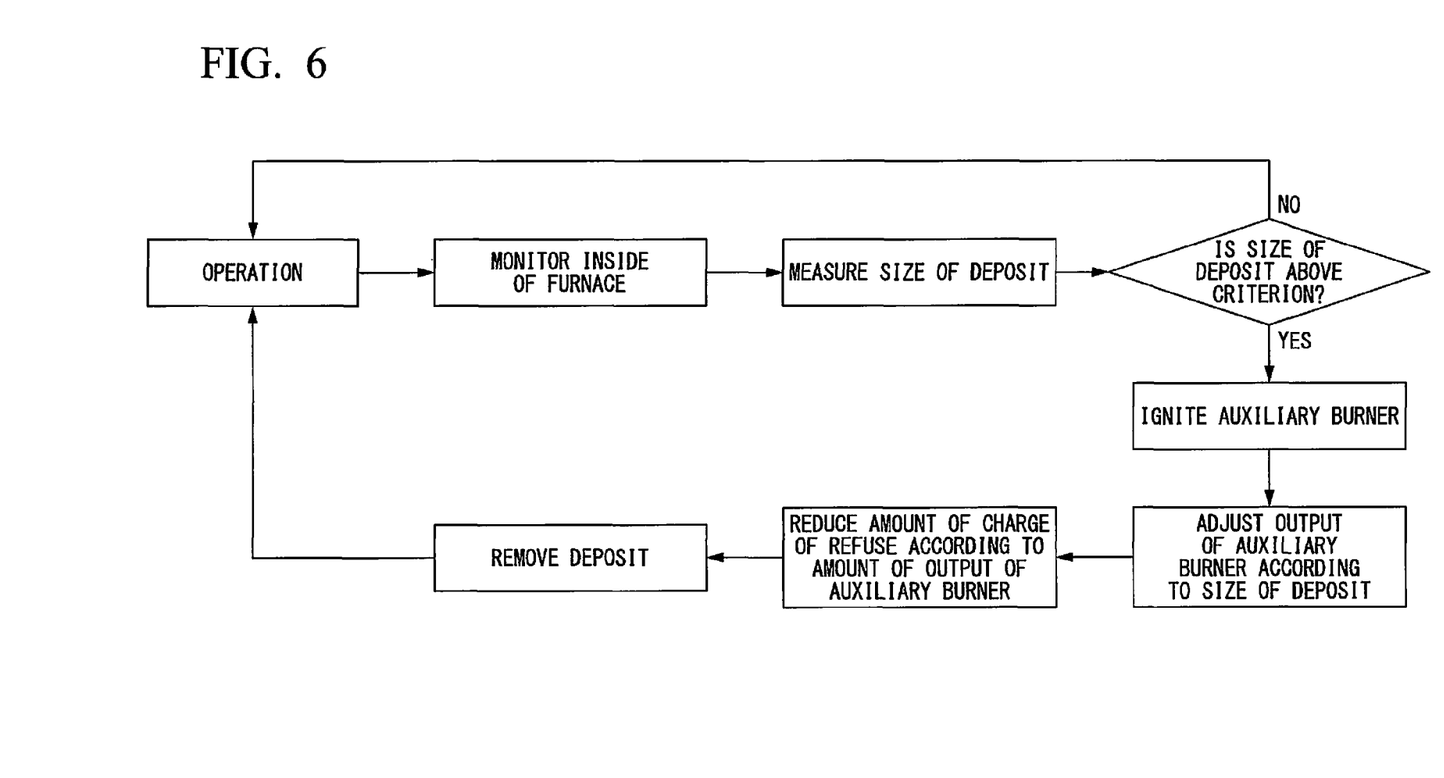
FIG. 6 is a flow chart illustrating the system for monitoring the inside of the high-temperature furnace according to the embodiment of the present invention.
Figure 7:
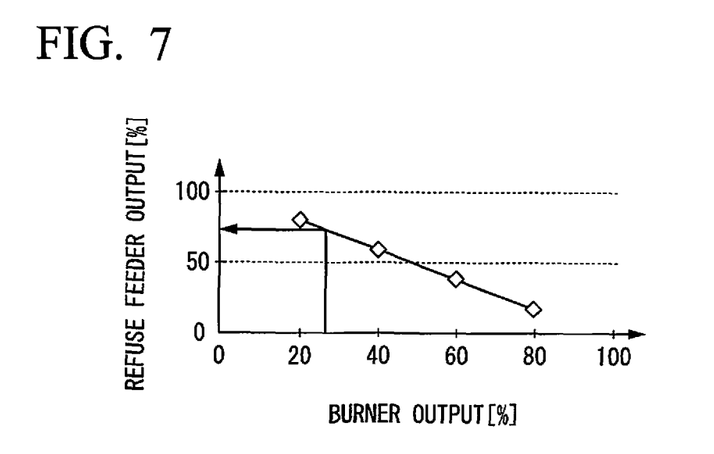
FIG. 7 is a view illustrating control data of incinerating target feeder output with respect to burner output in the system for monitoring the inside of the high-temperature furnace according to the embodiment of the present invention.
Figure 8:
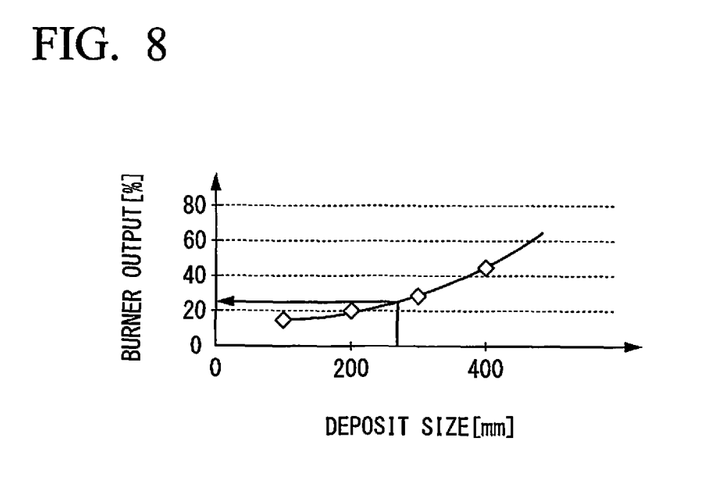
FIG. 8 is a view illustrating control data of burner output with respect to a size of a deposit in the system for monitoring the inside of the high-temperature furnace according to the embodiment of the present invention.

As illustrated in FIG. 5 (FIGS. 2 and 3), the inner casing 16 is formed in a substantially square cylindrical shape having a bottom and one side that has a shorter length than that of the outer casing 15, and is formed at a length of about 2500 mm in the direction of the axis O2 like the outer casing 15. Further, the inner casing 16 is provided with a mounting flange part 16c at a predetermined position near the rear end 16b thereof which protrudes outward from the outer surface (lateral surface) thereof in the direction perpendicular to the axis O1 and extends throughout the circumference thereof. Furthermore, in the present embodiment, the rear end 16b of the inner casing 16 is also blocked along with the front end 16a, and a cylindrical air supply port 24 is formed at a predetermined position between the mounting flange part 16c and the rear end 16b in the direction of the axis O2, and protrudes outward from the outer surface thereof in a direction perpendicular to the axis O2 while communicating the interior and exterior of the inner casing 16.

Furthermore, one lateral surface of the inner casing 16 which is near the front end 16a of the inner casing 16 is formed with two inner casing imaging ports 17 that pass through the inner and outer surfaces and are spaced apart from each other at a predetermined interval, for instance, at an interval of 100 to 300 mm, in the direction of the axis O2. Further, plug connector parts 25 are provided at respective positions at which these two inner casing imaging ports 17 are formed, and protrude outward from the outer surface in the direction perpendicular to the axis O2. Each plug connector part 25 is disposed such that an interior thereof communicates with the interior of the inner casing 16 through each inner casing imaging port 17. Further, each plug connector part 25 is formed in a tapered shape in which an outer diameter thereof is gradually reduced from a base end joined to one lateral surface of the inner casing 16 toward a front end in a protruding direction, and a male screw is threaded on an outer surface thereof and becomes a tapered screw.

Thus, a waterproof plug 26 is attached to each plug connector part 25 of the tapered screw. The waterproof plug 26 is formed in a substantially cylindrical shape in which an outer diameter thereof has the same size as an inner diameter of the outer casing imaging port 18 and an inner diameter thereof has the same size as an outer diameter of the plug connector part 25. Further, a female screw is threaded and formed on an inner surface of the waterproof plug 26. Furthermore, the waterproof plug 26 is formed with an annular flange part 26a at a rear end thereof in a central axis direction. The annular flange part 26a protrudes outward in a radial direction and extends throughout the circumference of the waterproof plug 26 in a circumferential direction. Furthermore, the flange part 26a is formed with an annular seal insertion groove 26b in a surface thereof which is directed toward a front end thereof. The annular seal insertion groove 26b is recessed toward the rear end of the flange part 26a and extends to be connected in a circumferential direction. A seal 27 such as an O-ring formed of a metal is inserted into and arranged in the seal insertion groove 26b.

Further, the inner casing 16 has a substantially rectangular gate 28 that is formed in the other lateral surface opposite to one lateral surface in which the inner casing imaging port 17 is formed and that passes through the inner surface and the outer surface (the other lateral surface) so as to insert and remove the imaging devices 19. The gate 28 is formed at the side of the front end 16a of the inner casing 16 so as to overlap the two inner casing imaging ports 17 of the one lateral surface in the direction perpendicular to the axis O2. Thus, the imaging devices 19 such as a CCD camera or a fiberscope are detachably inserted into and installed in the interior of the inner casing 16 through the gate 28. Further, in the state in which the imaging devices 19 are inserted into and installed in the interior of the inner casing 16 in this way, a plate-like cover member 31 for closing the gate 28 is detachably mounted on the other lateral surface of the inner casing 16.

At this time, as illustrated in FIG. 2, imaging holes 30 are formed by the inner casing imaging ports 17, the interiors of the plug connector parts 25, the outer casing imaging ports 18, and the waterproof plugs 26 screwed to the plug connector parts 25, all of which communicate with one another. The imaging devices 19 are provided such that an image of the outside thereof can be captured through the imaging holes 30 in a state in which a field of view of, for instance, 60 degrees or more is secured. Further, as illustrated in FIGS. 1 and 2, the two neighboring imaging devices 19 are arranged such that partial imaging regions P1 and P2 of the neighboring imaging devices 19 overlap.

Furthermore, as illustrated in FIG. 5 (FIGS. 2 and 3, FIG. 4), a pair of partition members 20 and 21, each of which is shaped of a substantially rectangular flat plate, are integrally provided on the one lateral surface and the other lateral surface of the inner casing 16. The partition members 20 and 21 protrude outward in the direction perpendicular to the axis O2 by connecting one widthwise ends thereof, and extend from the side of the front end 16a of the inner casing 16 to the mounting flange part 16c. Further, at this time, each of the partition members 20 and 21 is arranged by connecting the one widthwise end thereof to substantially the widthwise middle of each of the one lateral surface and the other lateral surface. Furthermore, one partition member 20 provided on the one lateral surface is formed by cutting out a portion which overlaps with the two plug connector parts 25, and the other partition member 21 provided on the other lateral surface is formed by cutting out a portion which overlaps with the cover member 31. Thus, the pair of partition members 20 and 21 are formed such that a width dimension t1 from the other end of the one partition member 20 including the inner casing 16 to the other end of the other partition member 21 is slightly smaller than an inner diameter t2 of the outer casing 15.

In the device B for monitoring the inside of the high-temperature furnace of the present embodiment, as illustrated in FIGS. 2 to 5, the inner casing 16 in which the imaging devices 19 are inserted and installed, to which the cover member 31 is attached, and from which the waterproof plugs 26 are removed is inserted into the outer casing 15 from the side of the front end 16a thereof. Thus, in a state in which the mounting flange part 16c of the inner casing 16 comes into contact with and overlaps the inner casing mounting flange part 15d of the outer casing 15, these flange parts 16c and 15d are fixed by bolts and nuts, and the outer casing 15 and the inner casing 16 are detachably integrated. Furthermore, in the state in which the inner casing 16 is integrated with the outer casing 15 in this way, the two plug connector parts 25 of the inner casing 16 are arranged to overlap the respective outer casing imaging ports 18 in the direction perpendicular to the axes O1 and O2, and the axes O1 and O2 of the outer casing 15 and the inner casing 16 are arranged coaxially. In this state, the male screws of the waterproof plugs 26 are screwed and attached to the female screws of the plug connector parts 25 of the inner casing 16 from the outside of the outer casing 15. Thereby, the outer casing 15 and the inner casing 16 are detachably integrated via the waterproof plugs 26, and the seals 27 of the flange parts 26a of the waterproof plugs 26 come into contact with the one lateral surface of the outer casing 15 and seal the outer casing 15.

As a result, while watertightness of the first flow channel R1 and the second flow channel R2 is secured by the waterproof plugs 26, the interior of the inner casing 16 communicates with the exterior thereof through the interiors of the plug connector parts 25 and the waterproof plugs 26. Thereby, the imaging holes 30 are formed, and an image of the outside thereof is captured at a field of view of 60 degrees or more by the imaging device 19. Further, along with this, the outer casing 15 and the inner casing 16 are detachably formed in one body via the waterproof plugs 26 and the plug connector parts 25. At this time, a thermocouple for mainly measuring a temperature of the imaging device 19 is installed in the inner casing 16.

Further, since the pair of partition members 20 and 21 are provided in the inner casing 16, when the inner casing 16 is inserted into the outer casing 15, a space between the inner surface of the outer casing 15 and the outer surface of the inner casing 16 is partitioned by the partition members 20 and 21. That is, when the partition members 20 and 21 are disposed in the outer casing 15, both the first flow channel R1 that acts as the cooling water feed flow channel, communicates with the outside through the cooling water supply port 23, and leads the cooling water W supplied from the cooling water supplying device connected to the cooling water supply port 23 toward the front end 15a between the inner surface of the outer casing 15 and the partition members 20 and 21, and the second flow channel R2 that acts as the cooling water return flow channel, communicates with the outside via the cooling water discharge port 22, and leads the cooling water W toward the rear end 15b between the inner surface of the outer casing 15 and the partition members 20 and 21 are defined.

Further, at this time, the communicating channel R3 that communicates the first and second flow channels R1 and R2 is defined between the bottom of the outer casing 15, the bottom of the inner casing 16, and the ends of partition members 20 and 21.

Thereby, in the device B for monitoring the inside of the high-temperature furnace of the present embodiment, the cooling water W flowing along the first flow channel R1 from the cooling water supplying device through the cooling water supply port 23 flows along the second flow channel R2 through the communicating channel R3, and is discharged from the cooling water discharge port 22. Thus, as the cooling water W flows at a flow rate of, for instance, about 35 L/min, the imaging device 19 and the entire device B for monitoring the inside of the high-temperature furnace are cooled so as not to be a predetermined temperature or more.

Further, at this time, in the device B for monitoring the inside of the high-temperature furnace of the present embodiment, the partition members 20 and 21 are attached to the one lateral surface and the other lateral surface of the inner casing 16 for which the plug connector parts 25, the waterproof plugs 26, and the cover member 31 are provided, and the space between the inner surface of the outer casing 15 and the outer surface of the inner casing 16 is partitioned in a bilaterally symmetrical shape by the pair of partition members 20 and 21. That is, the first and second flow channels R1 and R2 are formed as bilaterally symmetrical spaces having the same diameter and size by each of the partition members 20 and 21, and cooling water flow resistances of the first and second flow channels R1 and R2 can be identical to each other. Thereby, even when the device B for monitoring the inside of the high-temperature furnace is constructed in a double pipe structure having the plug connector parts 25, the waterproof plugs 26, and the cover member 31 and is made small, cooling performance can be reliably secured.

Further, in the device B for monitoring the inside of the high-temperature furnace, the air S is supplied from air supplying device through the air supply port 24 into the inner casing 16. The air S flows from the side of the rear end 16b of the inner casing 16 toward the side of the front end 16a, and is ejected and exhausted from the inner casing imaging ports 17 drilled at the positions at which the imaging devices 19 are arranged to the exterior of the outer casing 15 through the interiors of the plug connector parts 25, the outer casing imaging ports 18, and the interiors of the waterproof plugs 26, that is, through the imaging holes 30. In this way, the air S is ejected from the interior of the inner casing 16 to the exterior through the imaging holes 30. Thereby, it is possible to prevent foreign materials (slag or clinker) from intruding into the side of the imaging device 19 in the inner casing 16, and to prevent the slag or the clinker from being adhered to the imaging devices 19.

Thus, as illustrated in FIG. 1 (FIGS. 2 and 3), the device B for monitoring the inside of the high-temperature furnace of the present embodiment, in which the cooling water W and the air S are supplied to flow in this way, is inserted from the side of the front end 15a into the portion at which the observation window 12 of the melting furnace 5 is provided, and is disposed inside the high-temperature melting furnace 5. At this time, it is easy to install or further uninstall the device for monitoring the inside of the high-temperature furnace B in or from the melting furnace 5 because the device is reduced in weight and size in the double pipe structure compared to the related art. Further, even when the observation window 12 is blocked by the slag or the clinker, when the slag or the clinker is removed, a small hole consistent with the size (diameter) of the miniaturized device B needs to be opened, and work of removing the slag or the clinker of the observation window 12 can be remarkably reduced.

Then, when the device B for monitoring the inside of the high-temperature furnace is inserted into the melting furnace 5, the main body mounting flange part 15e of the outer casing 15 comes into contact with the melting furnace 5, for instance, a flange of the observation window 12, and the device B for monitoring the inside of the high-temperature furnace is arranged to extend a predetermined length into the melting furnace 5. Then, an image of the connecting port 9a (8a) of the pyrolysis duct 9 (8) is adapted to be captured by the two imaging devices 19, and the main body mounting flange part 15e of the outer casing 15 is fixed to the melting furnace 5.

Thereby, an image of the inside of the furnace at the side of the connecting port 9a (8a) of the pyrolysis duct 9 (8) is captured by the imaging devices 19, and captured image data is sent to the controller 7. Thus, at this time, in the device B for monitoring the inside of the high-temperature furnace of the present embodiment, since the image is captured by the two imaging devices 19, captured image data of a portion P3 at which the image capturing regions (field-of-view regions) P1 and P2 of the two imaging devices 19 overlap is converted into 3D (the captured image data can be converted into a stereoscopic image). For this reason, an interval between the imaging devices 19, a position at which the device B for monitoring the inside of the high-temperature furnace is mounted, etc. are set such that the portion P3 at which the image capturing regions overlap is disposed at the connecting port 9a (8a) of the pyrolysis duct 9 (8). Thereby, when the slag or the clinker is deposited on the connecting port 9a (8) of the pyrolysis duct 9 (8), a distance to the deposit M can be measured. Since the distance can be measured, a size of the deposit M can be determined.

Here, when the interval between the two imaging devices 19 is set to, for instance, 100 mm (200 mm), it is confirmed that the distance to the deposit M is measured with an error of ±20 mm (±10 mm).

Further, when the interval between the two imaging devices 19 is set to be smaller than 50 mm, the error of the distance measurement is excessively increased. When the interval between the two imaging devices 19 is set to be greater than 300 mm, the device itself is an obstacle when an image of the same place is captured. For this reason, the interval between the two neighboring imaging devices 19 (the plurality of imaging devices) is preferably 50 mm or more (300 mm or less).

As illustrated in FIGS. 1, 6, 7, and 8, in the device B for monitoring the inside of the high-temperature furnace and the system C for monitoring the inside of the high-temperature furnace of the present embodiment, data of an image and a temperature captured and measured by the device B for monitoring the inside of the high-temperature furnace is sent to the controller 7. It is monitored at any time whether the deposit M of the slag and the clinker occurs (or is present), and whenever the deposit M occurs, a size thereof is measured. Thus, when the size of the deposit M is above a preset criterion, the controller 7 ignites and drives the auxiliary burner 6, and control the auxiliary burner 6 so as to have output corresponding to the size of the deposit M. Thereby, the deposit M can be released by adequate output of the auxiliary burner 6 corresponding to the size of the deposit M.

Further, the controller 7 controls the driving of the auxiliary burner 6 as described above, and controls driving of the incinerating target feeder 4 such that an amount of charge of the refuse (an amount of feed of the burning/melting target) is reduced depending on an amount of output of the auxiliary burner 6. Thereby, when the auxiliary burner 6 is ignited, an amount of treatment of the refuse is automatically reduced, and a load of the melting furnace 5 is lightened.

Accordingly, in the device B for monitoring the inside of the high-temperature furnace of the present embodiment, as the partition members (barriers) 20 and 21 are provided in the double pipe structure of the outer casing 15 and the inner casing 16, one half of the space between the outer casing 15 and the inner casing 16 can be made into the first flow channel R1 serving as the feed flow channel (main channel) of the cooling water W, and the other half can be made into the second flow channel R2 serving as the return flow channel (return channel) of the cooling water W. Thereby, in comparison with a related art device constructed in a triple or quadruple pipe structure, the device B can be remarkably reduced in size and weight.

Thus, according to the device B for monitoring the inside of the high-temperature furnace of the present embodiment, in comparison with the related art, the device B has good handleability. When the inside of the furnace is monitored as needed, no great burden occurs even if the device B is inserted into and installed in the furnace each time. Without a limitation on the number of times of monitoring the inside of the furnace, the monitoring work can be suitably carried out. Further, even when the observation window 12 used when the device B is inserted into the furnace is blocked by the slag or the clinker, the device B is miniaturized, and thus work of removing the slag or the clinker can be remarkably reduced compared to the related art.

Further, in the device B for monitoring the inside of the high-temperature furnace of the present embodiment, the outer casing 15 and the inner casing 16 are detachably connected via the waterproof plugs 26, and thereby the double pipe structure can be constructed. For this reason, as the waterproof plugs 26 are removed, the inner casing 16 can be removed from the outer casing 15. Thereby, exchange or maintenance of the imaging device 19 such as a CCD camera or a fiberscope, adjustment of the imaging device 19 in a field-of-view direction, etc. can be easily performed. Accordingly, it is possible to improve the handleability of the device B for monitoring the inside of the high-temperature furnace, and to monitor the inside of the high-temperature furnace in a more accurate and efficient way.

Furthermore, since the gate 28 is formed in the inner casing 16 and is closed by the detachable cover member 31, the cover member 31 is removed as needed, the exchange or maintenance of the imaging device 19, the adjustment of the imaging device 19 in the field-of-view direction, etc. can be more easily performed through the gate 28.

Further, the plurality of imaging devices 19 are provided in the inner casing 16, and the partial image capturing regions P3 of the neighboring imaging devices 19 are arranged to overlap, that is, the imaging devices 19 are arranged in order to obtain a stereoscopic image. Thereby, it is possible to acquire a 3D image of the deposit M whose image is captured at the portion P3 at which the image capturing regions overlap. Thereby, a distance between the deposit M and the imaging devices 19 can be accurately measured in the high-temperature furnace. As a result, the size of the deposit M can be discriminated precisely. Accordingly, it is possible to drive the auxiliary burner 6 with a suitable timing corresponding to the size of the deposit M and to release the deposit M. It is possible to eliminate decision of the output of the auxiliary burner depending on experience and intuition of a worker as in the related art, or stopping of the operation of the furnace 5 to release the deposit M with manpower when the deposit M grows too large.

Further, in the system C for monitoring the inside of the high-temperature furnace of the present embodiment, operation and effects of the device B for monitoring the inside of the high-temperature furnace can be obtained, and the controller 7 discriminates the size of the deposit M from the image acquired by the imaging devices 19 of the device B for monitoring the inside of the high-temperature furnace, and controls driving of the auxiliary burner 6 and the incinerating target feeder 4 (burning/melting target feeder) based on the size of the deposit M. Thereby, it is possible to discriminate the growth of the deposit M to automatically perform optimal operation control of the auxiliary burner 6. It is possible to reduce a fuel cost, and to prevent damage to the furnace. Further, the driving of the incinerating target feeder 4 is controlled such that an amount of charge of the incinerating target (burning/melting target) is reduced depending on an amount of output of the auxiliary burner 6. Thereby, when the auxiliary burner 6 is ignited, an amount of treatment of the burning/melting target can be automatically reduced to lighten the load of the furnace 5.

An embodiment of the device for monitoring the inside of a high-temperature furnace and the system for monitoring the inside of the high-temperature furnace according to the present invention has been described, but the present invention is not limited to the embodiment, and may be appropriately modified without departing from the spirit or teaching thereof.

Figure 9:
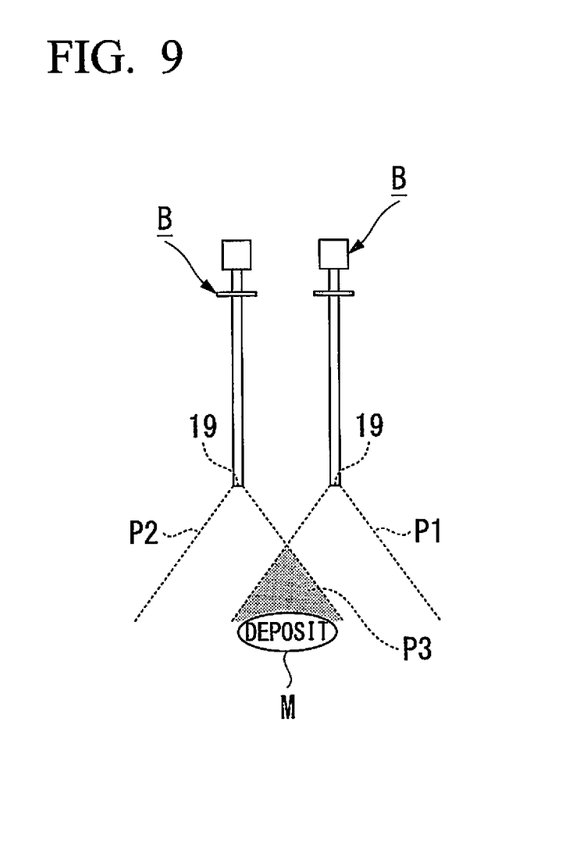
FIG. 9 is a view illustrating a modification of the system for monitoring the inside of the high-temperature furnace and the device for monitoring the inside of the high-temperature furnace according to the embodiment of the present invention.

For example, in the present embodiment, the two imaging devices 19 are provided in the device B for monitoring the inside of the high-temperature furnace, but two or more imaging devices 19 may be provided. Further, one imaging device 19 may be provided in one device B for monitoring the inside of the high-temperature furnace, and as illustrated in FIG. 9, two or more devices B for monitoring the inside of the high-temperature furnace may be inserted into and installed in the furnace for observation. At this time, the image capturing regions P1 and P2 of the respective imaging devices 19 of the plurality of devices B for monitoring the inside of the high-temperature furnace are arranged to overlap. Thereby, similar to the present embodiment, it is possible to acquire a 3D image of the deposit M, and to precisely measure the size of the deposit M.

Figure 10:
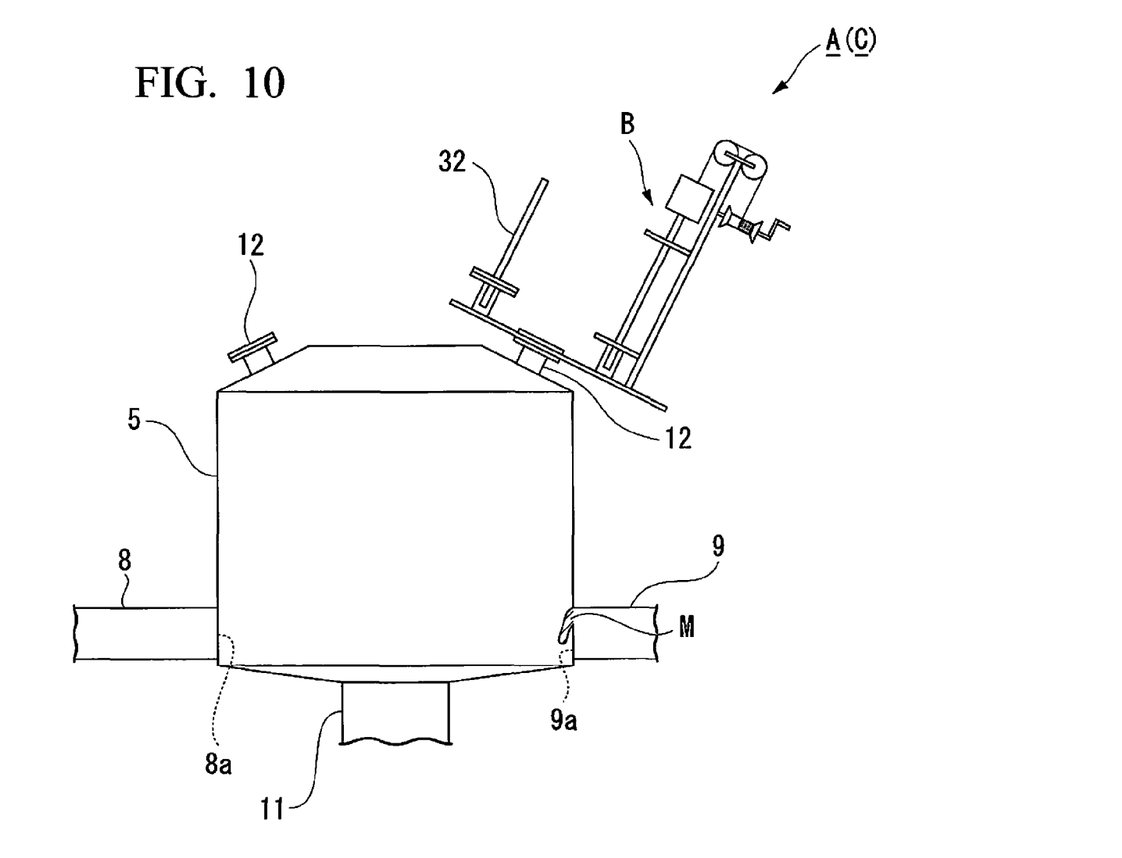
FIG. 10 is a view illustrating a modification of the system for monitoring the inside of the high-temperature furnace and the device for monitoring the inside of the high-temperature furnace according to the embodiment of the present invention.

Further, although the device B for monitoring the inside of the high-temperature furnace of the present embodiment is permanently installed in the furnace, the device may be used in such a way that it is inserted into the furnace as needed. Further, as illustrated in FIG. 10, when the device is mounted in the furnace in combination with, for instance, the rammer 32, the device may be adapted to be selectively used as needed.

INDUSTRIAL APPLICABILITY

In the device for monitoring the inside of the high-temperature furnace according to the present invention, as the partition members (barriers) are provided in the double pipe structure of the outer casing and the inner casing, one half of the space between the outer casing and the inner casing can be made into a first flow channel serving as a feed flow channel (main channel) of cooling water, and the other half can be made into a second flow channel serving as a return flow channel (return channel) of the cooling water. Thereby, in comparison with a related art device constructed in a triple or quadruple pipe structure, the device can be remarkably reduced in size and weight.

REFERENCE SIGNS LIST

1: incinerating target (burning/melting target)
2: hopper
3: gasification furnace
4: incinerating target feeder (burning/melting target feeder)
5: melting furnace (furnace)
6: auxiliary burner
7: controller
8: first pyrolysis duct
8a: connecting port
9: second pyrolysis duct
9a: connecting port
10: output adjusting device
11: slag discharge port
12: observation window
15: outer casing
15a: front end
15b: rear end
15c: one lateral surface
15d: inner casing mounting flange part
15e: main body mounting flange part
16: inner casing
16a: front end
16b: rear end
16c: mounting flange part
17: inner casing imaging port
18: outer casing imaging port
19: imaging device
20: partition member
21: partition member
22: cooling water discharge port 23: cooling water supply port
24: air supply port
25: plug connector part
26: waterproof plug
26a: flange part
26b: seal insertion groove
27: seal
28: gate
30: imaging hole
31: cover member
A: incineration facility
B: device for monitoring inside of high-temperature furnace
C: system for monitoring inside of high-temperature furnace
O1: axis of outer casing
O2: axis of inner casing
P1: image capturing region
P2: image capturing region
P3: overlapping image capturing region
R1: first flow channel
R2: second flow channel
R3: communicating channel
S: air
M: deposit
W: cooling water

The invention claimed is:

1. A device for monitoring an inside of a high-temperature furnace comprising:
    an outer casing formed in a bottomed tube shape, configured to have a cooling water supply port and a cooling water discharge port formed at a side of a rear end thereof in a direction of an axis wherein cooling water is introduced into the cooling water supply port and is discharged from the cooling water discharge port, and inserted into the high-temperature furnace;
    an inner casing formed in a bottomed tube shape, inserted into and detachably disposed in the outer casing, and formed with an air supply port for supplying cooling air to an interior thereof;
    an imaging device disposed in the inner casing and configured to capture an image of an exterior of the outer casing; and
    partition members arranged between an inner surface of the outer casing and an outer surface of the inner casing, and configured to define a first flow channel that leads the cooling water toward front ends of the casings in the direction of the axis and a second flow channel that leads the cooling water toward rear ends of the casings between the inner surface of the outer casing and the partition members, and a communicating channel that communicates the first flow channel and the second flow channel between a bottom of the outer casing and the partition members,
    wherein an inner casing imaging port passing through an inner surface and the outer surface of the inner casing is provided at a position at which the imaging device is disposed in the inner casing, and
    an outer casing imaging port passing through the inner surface and an outer surface of the outer casing is provided at a position at which the imaging device is disposed in the outer casing.

2. The device for monitoring the inside of the high-temperature furnace according to claim 1, wherein:
    a cylindrical plug connector part that protrudes outward in a direction perpendicular to the axis while communicating the interior with the inner casing imaging port is integrally provided;
    a waterproof plug having a substantially cylindrical shape is connected to the plug connector part from an outside of the outer casing through the outer casing imaging port in a state in which interiors of the waterproof plug and the plug connector part communicate with each other, and the outer casing and the inner casing are detachably formed in one body via the waterproof plug and the plug connector parts; and
    the inner casing imaging port, the interior of the plug connector part, the outer casing imaging port, and the interior of the waterproof plug communicate with each other while waterproofness of the first flow channel and the second flow channel is secured by the waterproof plug, and an imaging hole for capturing an image of the exterior of the outer casing using the imaging device is formed.

3. The device for monitoring the inside of the high-temperature furnace according to claim 1, wherein
    a gate that passes through the inner surface and the outer surface thereof and inserts and removes the imaging device into and from the interior thereof is formed in the inner casing, and a cover member that closes the gate is detachably provided in the inner casing.

4. The device for monitoring the inside of the high-temperature furnace according to claim 1, wherein:
    a plurality of imaging devices are provided in the inner casing; and
    the plurality of imaging devices are arranged such that partial image capturing regions of the neighboring imaging devices overlap.

5. A system for monitoring an inside of a high-temperature furnace, the system comprising:
    the device for monitoring the inside of the high-temperature furnace according to claim 1, wherein the device is inserted into and disposed in the high-temperature furnace and monitors a generated state of a deposit in the furnace;
    an auxiliary burner provided in the furnace and configured to release the deposit;
    a burning/melting target feeder configured to feed a burning/melting target into the furnace; and
    a controller configured to discriminate a size of the deposit from an image acquired by the imaging device of the device for monitoring the inside of the high-temperature furnace and to control driving of the auxiliary burner and the burning/melting target feeder based on the size of the deposit.

* * * * *